(12) United States Patent
Chang et al.

(10) Patent No.: US 8,804,061 B2
(45) Date of Patent: Aug. 12, 2014

(54) DEVICES AND METHODS FOR REDUCING THE SIZE OF DISPLAY PANEL ROUTINGS

(75) Inventors: Ting-Kuo Chang, Cupertino, CA (US); Shih-Chang Chang, Cupertino, CA (US); Abbas Jamshidi Roudbari, Sunnyvale, CA (US); Cheng-Ho Yu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 15 days.

(21) Appl. No.: 13/477,953

(22) Filed: May 22, 2012

(65) Prior Publication Data

US 2013/0271684 A1 Oct. 17, 2013

Related U.S. Application Data (60) Provisional application No. 61/622,926, filed on Apr. 11, 2012.

(51) Int. Cl.
*G02F 1/1368* (2006.01)
*G02F 1/1343* (2006.01)

(52) U.S. Cl.
USPC ............. 349/43; 349/147; 349/148; 349/149; 349/187

(58) Field of Classification Search
USPC ............. 349/42, 43, 147, 148, 149, 152, 187; 257/59, 72; 438/30
See application file for complete search history.

(56) References Cited

U.S. PATENT DOCUMENTS

| | | | |
|---|---|---|---|
| 6,201,590 B1 * | 3/2001 | Ohta et al. | 349/141 |
| 6,387,751 B2 | 5/2002 | Tominaga | |
| 7,522,224 B2 | 4/2009 | Hwang | |
| 7,646,021 B2 | 1/2010 | Wang | |
| 7,952,093 B2 | 5/2011 | Yamazaki | |
| 2002/0057396 A1 | 5/2002 | Tsubo | |
| 2004/0041958 A1 * | 3/2004 | Hwang et al. | 349/43 |
| 2005/0231675 A1 * | 10/2005 | Chen et al. | 349/141 |
| 2005/0285987 A1 * | 12/2005 | Azumada et al. | 349/43 |
| 2008/0149930 A1 * | 6/2008 | Lee et al. | 257/59 |
| 2011/0227060 A1 | 9/2011 | Miyanaga | |

\* cited by examiner

*Primary Examiner* — Dung Nguyen
*Assistant Examiner* — Tai Duong
(74) *Attorney, Agent, or Firm* — Fletcher Yoder PC (57) ABSTRACT

Disclosed embodiments relate to signal routings for use in a display device. The display device may include a liquid crystal display (LCD) panel having multiple pixels arranged in rows and columns. Each of the pixels includes a pixel electrode and a thin-film transistor (TFT). The LCD may include a conductive signal routing portion having a first metallic layer, a second metallic layer formed directly on the first metallic layer, and a third metallic layer formed directly on the second metallic layer. The first metallic layer may include a contact terminal. The second metallic layer when combined with the third metallic layers may decrease the resistance of the third metallic layer.

19 Claims, 8 Drawing Sheets

DEVICES AND METHODS FOR REDUCING THE SIZE OF DISPLAY PANEL ROUTINGS

CROSS REFERENCE TO RELATED APPLICATIONS

This application is a Non-Provisional Patent Application of U.S. Provisional Patent Application No. 61/622,926, entitled "Devices and Methods for Reducing the Size of Display Panel Routings", filed Apr. 11, 2012, which is herein incorporated by reference.

BACKGROUND

The present disclosure relates generally to liquid crystal displays (LCDs) and, more specifically, to devices and methods for reducing the size of display panel routings.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Flat panel displays, such as liquid crystal displays (LCDs), are commonly used in a wide variety of electronic devices, including such consumer electronics as televisions, computers, and handheld devices (e.g., cellular telephones, audio and video players, gaming systems, and so forth). Such display panels typically provide a flat display in a relatively thin package that is suitable for use in a variety of electronic goods. In addition, such devices typically use less power than comparable display technologies, making them suitable for use in battery-powered devices or in other contexts where it is desirable to minimize power usage.

LCD devices typically include picture elements (image pixels) arranged in a matrix to display an image that may be perceived by a user. The matrix, sometimes called an array, includes rows and columns of thin-film-transistors (TFTs) arranged adjacent to a layer of liquid crystal material, wherein the each TFT represents an image pixels. Individual pixels of an LCD device may variably permit light to pass when an electric field is applied to a liquid crystal material in each pixel, which may be generated based upon a voltage difference between a pixel electrode and a common electrode. The TFT of the pixel passes the voltage difference onto a pixel electrode when an activation voltage is applied to its gate and a data signal voltage is applied to its source. By controlling the amount of light that may be emitted from each pixel, the LCD, in conjunction with a color filter array, may cause a viewable color image to be displayed.

As electronic devices become smaller and/or as the number of pixels of an LCD increases, the components of the pixels may be manufactured with a smaller size. This reduction in size may present various engineering and/or manufacturing challenges. For example, when a width of a metallic LCD panel routing is reduced and the other dimensions of the metallic LCD panel routing remain the same, the resistance of the metallic LCD panel routing usually increases. This increase in resistance may cause an undesirable increase in the power consumed by an electronic device that includes such a routing. In certain embodiments, the resistance of a metallic LCD panel routing may be reduced by increasing the depth of a layer forming the metallic LCD panel routing. Unfortunately, when the depth of a layer forming the metallic LCD panel routing increases, it may be more difficult to etch the layer to a desired dimension.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The embodiments described below relate generally to pixels for use in a display device. For example, the display device may include a liquid crystal display (LCD) panel having multiple pixels arranged in rows and columns, with each row corresponding to a gate line and each column corresponding to a data line. Each of the pixels includes a pixel electrode and a thin-film-transistor (TFT). The TFT may be coupled to the data line and the gate line. For each TFT, a source of the TFT may be coupled to the data line and a drain of the TFT may be coupled to the pixel electrode. A channel of the TFT may extend between the source and the drain. The LCD may include a conductive signal routing portion to route various signals of the LCD. The conductive signal routing portion may include a first metallic layer, a second metallic layer formed directly on the first metallic layer, and a third metallic layer formed directly on the second metallic layer. The first metallic layer may comprise a contact terminal. The second metallic layer when combined with the third metallic layers may decrease the resistance of the third metallic layer. This may allow a width of the third metallic layer to be decreased without increasing a depth of the third metallic layer.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. The embodiments discussed below are intended to be examples that are illustrative in nature and should not be construed to mean that the specific embodiments described herein are necessarily preferential in nature. Additionally, it should be understood that references to "one embodiment," "an embodiment," "some embodiments," and the like are not intended to be interpreted as excluding the existence of additional embodiments that also incorporate the disclosed features.

For the sake of clarity, it is noted that in discussing the relationship between deposited materials, the terms "over," or "above" are used to describe materials that are connected but that may, or may not, be in direct contact. By contrast, the term "directly on" is used to indicate direct contact between the materials described.

Figure 1:
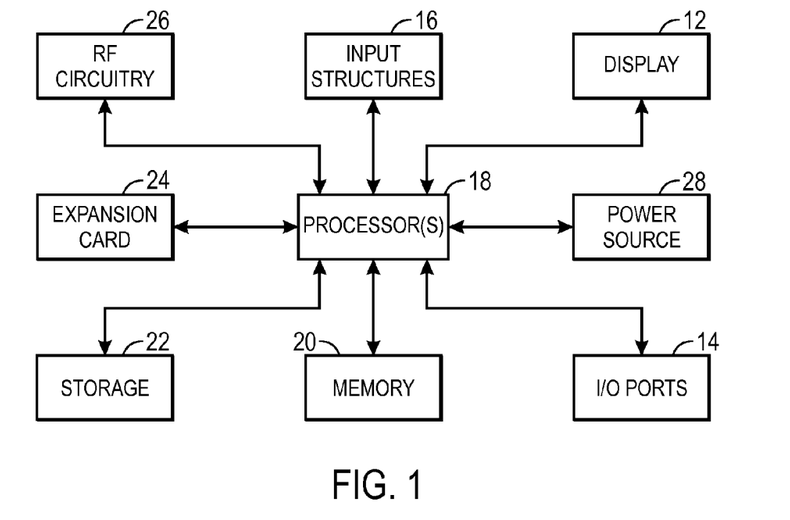
FIG. 1 is a simplified block diagram depicting components of an example of an electronic device having an LCD that includes panel routings with reduced widths, in accordance with aspects of the present disclosure.

FIG. 1 provides a block diagram illustrating an example of an electronic device 10 having a display 12. The display 12 may include a liquid crystal display (LCD) having routings with reduced widths, in accordance with aspects of the present disclosure. As will be discussed in further detail below, an LCD utilizing such reduced routings may allow smaller displays 12 and/or smaller pixels to be manufactured without increasing the power consumed by the displays 12.

The electronic device 10 may be any type of electronic device that includes the display 12, such as a laptop or desktop computer, a mobile phone, a digital media player, or the like. The functional blocks depicted in FIG. 1 may include hardware elements (e.g., circuitry), software elements (e.g., computer code stored on computer-readable media, such as a hard drive or system memory), or a combination of both hardware and software elements. It should be noted that FIG. 1 is merely one example of a particular implementation and is intended to illustrate the types of components that may be present in such a device. For example, in the illustrated embodiment, these components may include the display 12 referenced above, as well as input/output (I/O) ports 14, input structures 16, one or more processors 18, memory device(s) 20, non-volatile storage 22, expansion card(s) 24, RF circuitry 26, and power source 28.

As discussed above, the display 12 may include an LCD and may display various images generated by the electronic device 10. For example, the display 12 may be an LCD employing fringe-field switching (FFS), in-plane switching (IPS) or other techniques used in operating such LCD devices. The display 12 may be a color display utilizing multiple color channels, such as red, green, and blue color channels, for generating color images. As discussed further below, the display 12 in the form of an LCD may include a panel having routings with reduced widths, which may be formed to have a low resistance, thus decreasing power consumption of the routings. In one embodiment, the display may be a high-resolution LCD display having 300 or more pixels per inch, such as a Retina Display®, available from Apple Inc. of Cupertino, Calif. Moreover, in some embodiments, the display 12 may be provided in conjunction with a touch-sensitive element, such as a touch screen, that may function as one of the input structures 16 for the electronic device 10. For instance, the touch screen may sense inputs based on contact with a user's finger or with a stylus.

The processor(s) 18 may control the general operation of the device 10. For instance, the processor(s) 18 may provide the processing capability to execute an operating system, programs, user and application interfaces, and any other functions of the device 10. The processor(s) 18 may include one or more microprocessors, such as one or more general-purpose microprocessors, application-specific microprocessors (ASICs), or a combination of such processing components. For example, the processor(s) 18 may include one or more processors based upon x86 or RISC instruction set architectures, as well as dedicated graphics processors (GPU), image signal processors, video processors, audio processors and/or related chip sets. By way of example only, the processor(s) 18 may include a model of a system-on-a-chip (SoC) processor available from Apple Inc., such as a model of the A4 or A5 processors.

The instructions or data to be processed by the processor(s) 18 may be stored in a computer-readable medium, such as a memory device 20. The memory device 20 may be provided as volatile memory, such as random access memory (RAM), or as non-volatile memory, such as read-only memory (ROM), or as a combination of RAM and ROM devices. The memory 20 may store a variety of information and may be used for various purposes. For example, the memory 18 may store firmware for the device 10, such as a basic input/output system (BIOS), an operating system, various programs, applications, or any other routines that may be executed on the device 10, including user interface functions, processor functions, and so forth.

The device 10 may also include a non-volatile storage 22 for persistent storage of data and/or instructions. For instance, the non-volatile storage 20 may include flash memory, a hard drive, or any other optical, magnetic, and/or solid-state storage media, or some combination thereof. Thus, while depicted as a single device in FIG. 1 for clarity, the non-volatile storage 22 may include a combination of one or more of storage devices operating in conjunction with the processor(s) 18. The non-volatile storage 22 may be used to store firmware, data files, image data, software programs and applications, and any other suitable data. For instance, the non-volatile storage 22 may store image data that may be displayed as a viewable image using the display 12. Further, the RF circuitry 26 may enable the device 10 to connect to a network, such as a local area network, a wireless network (e.g., an 802.11x network or Bluetooth network), or a mobile network (e.g., EDGE, 3G, 4G, LTE, WiMax, etc.), and to communicate with other devices over the network.

Figure 2:
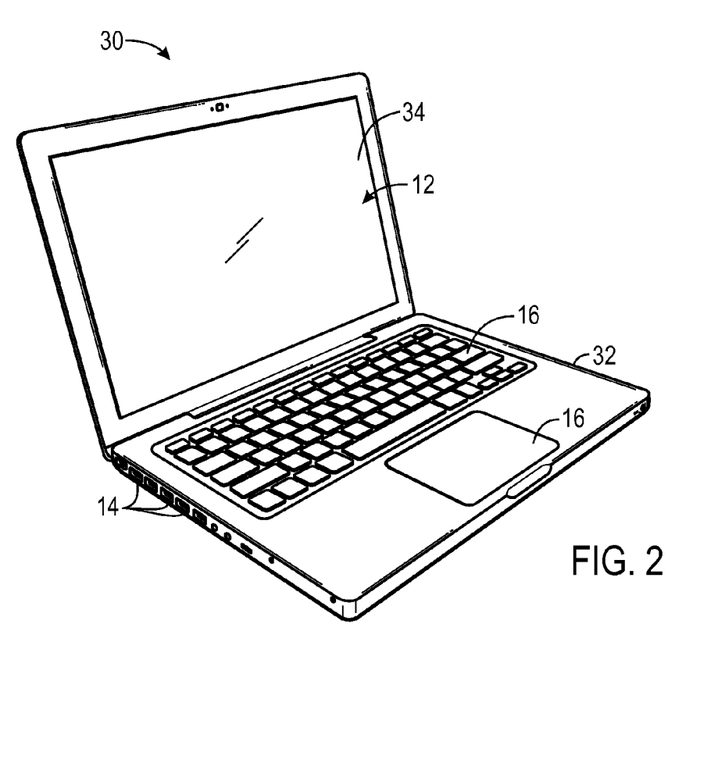
FIG. 2 shows the electronic device of FIG. 1 in the form of a computer.

FIG. 2 illustrates an embodiment of the electronic device 10 in the form of a computer 30. The computer 30 may include portable computers (such as laptop, notebook, tablet, and handheld computers), as well as non-portable computers generally used in one location (such as desktop computers, workstations and/or servers). The computer 30 includes a housing or enclosure 32, the display 12, I/O ports 14, and input structures 16. By way of example only, embodiments of the computer 30 may include a model of a MacBook®, MacBook Pro®, MacBook Air®, iMac®, Mac Mini®, or Mac Pro®, all available from Apple Inc.

The display 12 may be integrated (e.g., the display of a laptop computer) or may be a standalone display that interfaces with the computer 30 through one of the I/O ports 14, such as via a DisplayPort, DVI, High-Definition Multimedia Interface (HDMI), or analog interface. For instance, in certain embodiments, a standalone display 12 may be a model of an Apple Cinema Display®, available from Apple Inc. As will be discussed in further detail below, the display 12 may be an LCD display that includes an LCD panel 34 having an array of TFTs, which may include routings with reduced widths to decrease the size of the array.

Figure 3:
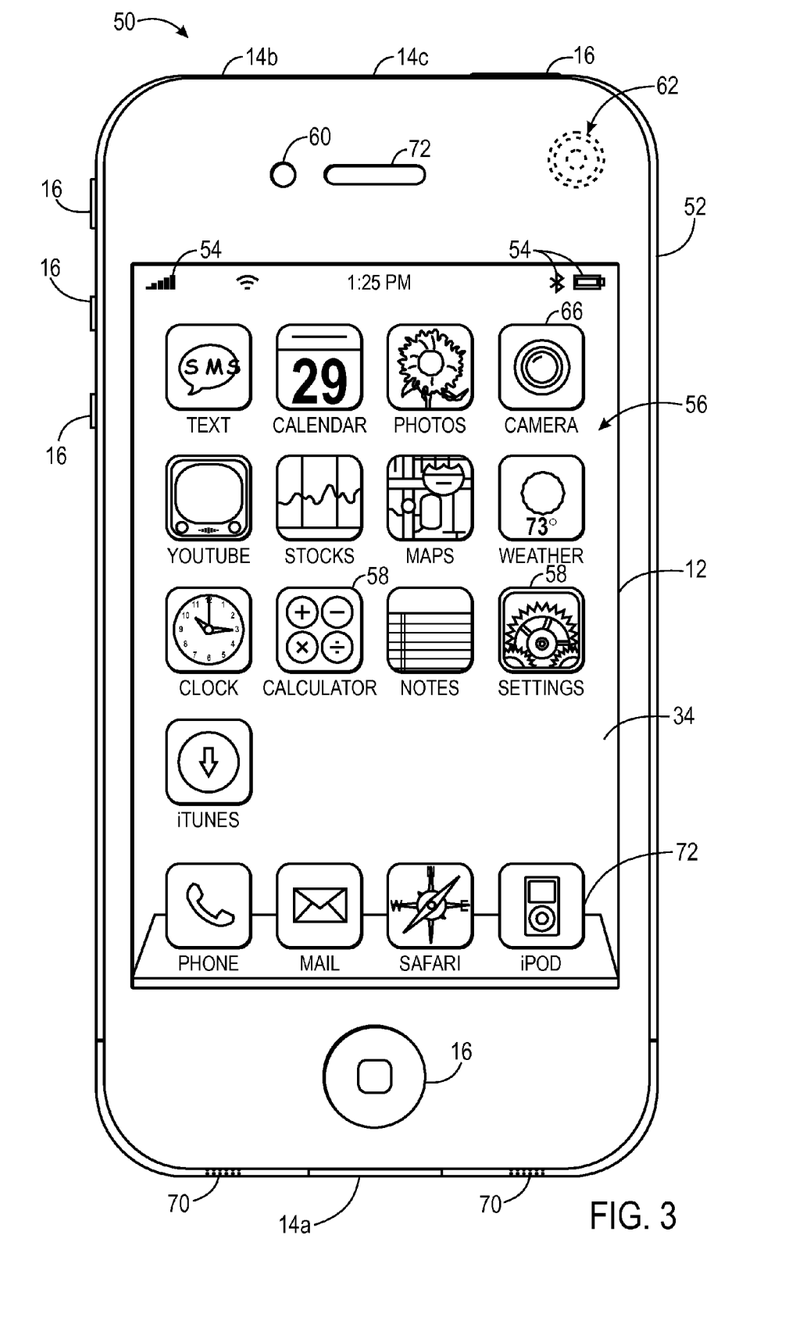
FIG. 3 is a front view of the electronic device of FIG. 1 in the form of a handheld portable electronic device.
Figure 4:
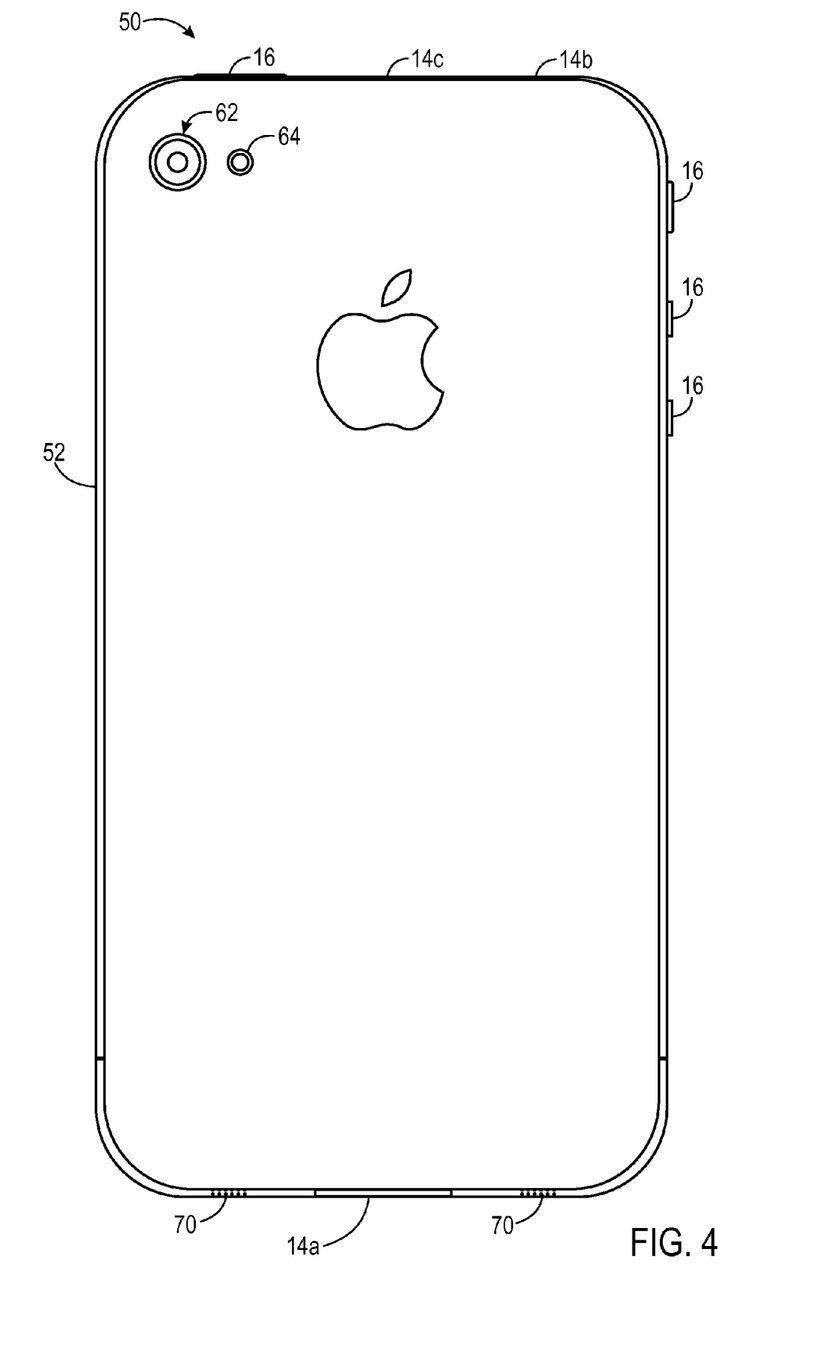
FIG. 4 is a rear view of the handheld electronic device shown in FIG. 3.

FIGS. 3 and 4 depict the electronic device 10 in the form of a portable handheld electronic device 50, which may be a model of an iPod® or iPhone® available from Apple Inc. The handheld device 50 includes an enclosure 52, which may protect the interior components from physical damage and may also allow certain frequencies of electromagnetic radiation, such as wireless networking and/or telecommunication signals, to pass through to wireless communication circuitry (e.g., RF circuitry 26) disposed within the enclosure 52. As shown, the enclosure 52 also includes various user input structures 16 through which a user may interface with the handheld device 50. For instance, each input structure 16 may be configured to control one or more device functions when pressed or actuated.

The device 50 also includes various I/O ports 14, such as connection port 14a (e.g., a 30-pin dock-connector available from Apple Inc.) for transmitting and receiving data and/or for charging a power source 28, which may include one or more removable, rechargeable, and/or replaceable batteries. The I/O ports 14 may also include an audio connection port 14b for connecting the device 50 to an audio output device (e.g., headphones or speakers). In embodiments where the handheld device 50 provides mobile phone functionality, the I/O port 14c may receive a subscriber identity module (SIM) card (e.g., an expansion card 24).

The display 12 of the handheld device 50 may also include the LCD panel 34 and may display various images generated by the device 50. For example, the display 12 may display system indicators 54 providing feedback to a user regarding one or more states of handheld device 50, such as power status, signal strength, and so forth. The display 12 may also display a graphical user interface (GUI) 56 that allows a user to interact with the device 50. In the illustrated embodiment, the displayed image of the GUI 56 may represent a home-screen of an operating system running on the device 50, which may be a version of the Mac OS® or iOS® operating systems, both available from Apple Inc. The GUI 56 may include various graphical elements, such as icons 58, corresponding to applications that may be executed when selected by a user (e.g., receiving a user input corresponding to the selection of a particular icon 58).

The handheld device 50 also includes a front-facing camera 60 on the front side of the device 50 and a rear-facing camera 62 on the rear side of the device (shown in FIG. 4). In certain embodiments, one or more of the cameras 60 or 62 may be used in conjunction with a camera application 66 to acquire images for storage and viewing on the device 50. The rear side of the device 50 may include a flash module 64 (also referred to as a strobe), such as an LED, for illuminating an image scene captured using the camera 62 in low light conditions. The cameras 60 and 62 may also be utilized to provide video-conferencing capabilities, such as via use of FaceTime®, a video conferencing application available from Apple Inc. Additionally, the handheld device 50 may include various audio input and output elements 70 and 72. In embodiments where the device 50 includes mobile phone functionality, the audio input/output elements 70 and 72 may collectively function as the audio receiving and transmitting elements of a telephone.

Figure 5:
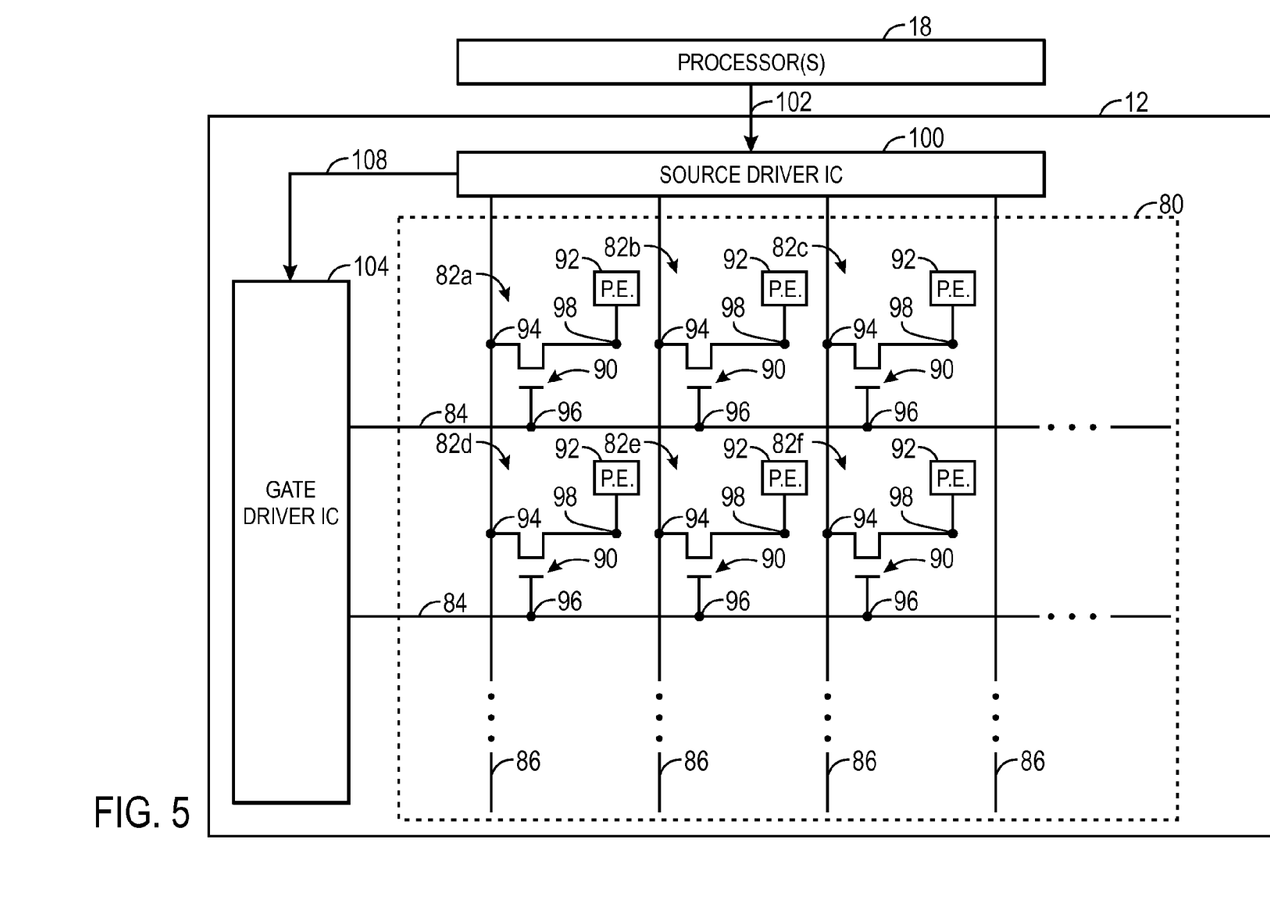
FIG. 5 is a circuit diagram illustrating a portion of an array of unit pixels of the display device of FIG. 1, in accordance with aspects of the present disclosure.

Referring now to FIG. 5 a circuit diagram of the display 12 is illustrated, in accordance with an embodiment. As shown, the display 12 may include a display panel 80, such as a liquid crystal display panel. The display panel 80 may include multiple unit pixels 82 arranged as an array or matrix defining multiple rows and columns of unit pixels 82 that collectively form a viewable region of the display 12 in which an image may be displayed. In such an array, each unit pixel 82 may be defined by the intersection of rows and columns, represented here by the illustrated gate lines 84 (also referred to as "scanning lines") and source lines 86 (also referred to as "data lines"), respectively.

Although only six unit pixels, referred to individually by reference numbers 82a-82f, respectively, are shown, it should be understood that in an actual implementation, each source line 86 and gate line 84 may include hundreds or even thousands of such unit pixels 82. By way of example, in a color display panel 80 having a display resolution of 1024×768, each source line 86, which may define a column of the pixel array, may include 768 unit pixels, while each gate line 84, which may define a row of the pixel array, may include 1024 groups of unit pixels with each group including a red, blue, and green pixel, thus totaling 3072 unit pixels per gate line 84. By way of further example, the panel 80 may have a resolution of 480×320 or, alternatively, 960×640. As will be appreciated, in the context of LCDs, the color of a particular unit pixel generally depends on the color filter that is disposed over a liquid crystal layer of the unit pixel. In the presently illustrated example, the unit pixels 82a-82c may represent a group of pixels having a red pixel (82a), a blue pixel (82b), and a green pixel (82c). The group of unit pixels 82d-82f may be arranged in a similar manner. Additionally, in the industry, it is also common for the term "pixel" may refer to a group of adjacent different-colored pixels (e.g., a red pixel, blue pixel, and green pixel), with each of the individual colored pixels in the group being referred to as a "sub-pixel."

Each unit pixel 82a-82f shown in FIG. 5 includes a thin-film transistor (TFT) 90 for switching a respective pixel electrode 92. The pixel electrode 92 may be formed from indium tin oxide (ITO), or any suitable electrically conductive material that provides optical transparency. In the illustrated embodiment, the source 94 of each TFT 90 may be electrically connected to a source line 86. Similarly, the gate 96 of each TFT 90 may be electrically connected to a gate line 84. Furthermore, the drain 98 of each TFT 90 may be electrically connected to a respective pixel electrode 92. Each TFT 90 serves as a switching element and may be activated and deactivated (e.g., switched on and off) for a predetermined period based upon the respective presence or absence of a gate activation signal (also referred to as a scanning signal) at the gate 96 of the TFT 90. For instance, when activated, the TFT 90 may store the image signals received via a respective source line 86 as a charge in its corresponding pixel electrode 92. The image signals stored by pixel electrode 92 may be used to generate an electrical field between the respective pixel electrode 92 and a common electrode (not shown in FIG. 5), which may collectively form a capacitor for a given unit pixel 82. The electrical field may align liquid crystals molecules within a liquid crystal layer to modulate light transmission through a region of the liquid crystal layer corresponding to the unit pixel 82. For instance, light is typically transmitted through the unit pixel 82 at an intensity corresponding to the applied voltage (e.g., from a corresponding source line 86).

The display 12 also includes a source driver integrated circuit (IC) 100, which may include a chip, such as a processor or ASIC, configured to control various aspects of display 12 and panel 80. For example, the source driver IC 100 may receive image data 102 from the processor(s) 18 and send corresponding image signals to the unit pixels 82 of the panel 80. The source driver IC 100 may also be coupled to a gate driver IC 104, which may be configured to provide/remove gate activation signals to activate/deactivate rows of unit pixels 82 via the gate lines 84. The source driver IC 100 may include a timing controller that determines and sends timing information 108 to the gate driver IC 104 to facilitate activation and deactivation of individual rows of pixels 82. In other embodiments, timing information may be provided to the gate driver IC 104 in some other manner (e.g., using a timing controller that is separate from the source driver IC 100). Further, while FIG. 5 depicts only a single source driver IC 100, it should be appreciated that other embodiments may utilize multiple source driver ICs 100 to provide image signals 102 to the pixels 82. For example, additional embodiments may include multiple source driver ICs 100 disposed along one or more edges of the panel 80, with each source driver IC 100 being configured to control a subset of the source lines 86 and/or gate lines 84.

In operation, the source driver IC 100 receives image data 102 from the processor 18 or a discrete display controller and, based on the received data, outputs signals to control the pixels 82. For instance, to display image data 102, the source driver IC 100 may adjust the voltage of the pixel electrodes 92 (abbreviated in FIG. 5 as P.E.) one row at a time. To access an individual row of pixels 82, the gate driver IC 104 may assert a gate activation signal to the TFTs 90 associated with the particular row of pixels 82 being addressed, which causes those TFTs 90 to switch on. This activation signal may render the TFTs 90 on the addressed row conductive, and image data 102 corresponding to the addressed row may be transmitted from source driver IC 100 to each of the unit pixels 82 within the addressed row via respective data lines 86. Thereafter, the gate driver IC 104 may deactivate the TFTs 90 in the addressed row by de-asserting the gate activation signal, thus switching the TFTs 90 of the row off and impeding the pixels 82 within that row from changing state until the next time they are addressed. The above-described process may be repeated for each row of pixels 82 in the panel 80 to reproduce image data 102 as a viewable image on the display 12.

Figure 6:
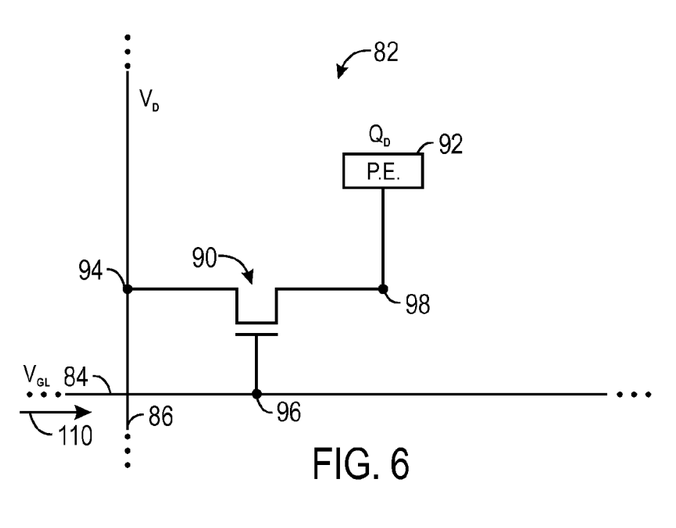
FIG. 6 shows one of the unit pixels from FIG. 5 that includes a thin-film-transistor (TFT), in accordance with aspects of the present disclosure.

Referring to FIG. 6, a single unit pixel 82 that may be one of the unit pixels 82 shown in the panel 80 of FIG. 5 is illustrated in further detail. The gate line 84 may provide a gate activation signal 110 corresponding to a voltage, referred to as $V_{GL}$. When the voltage $V_{GL}$ is equal to or greater than the threshold voltage of the TFT 90, the TFT 90 switches on, and a conductive path is formed between the source line 86 and the pixel electrode 92. Accordingly, a data voltage $V_D$ provided to the source line 86 and corresponding to image data may be stored in the pixel electrode 92 as a charge $Q_D$ representative of the data voltage $V_D$. When the gate activation signal 110 is de-asserted, such that the $V_{GL}$ drops below the threshold voltage of the TFT 90, the TFT switches to an off state. The charge QD generally remains stored in the pixel electrode 92 until the next time the gate line 84 is addressed (e.g., for the next frame of image data).

Figure 7:
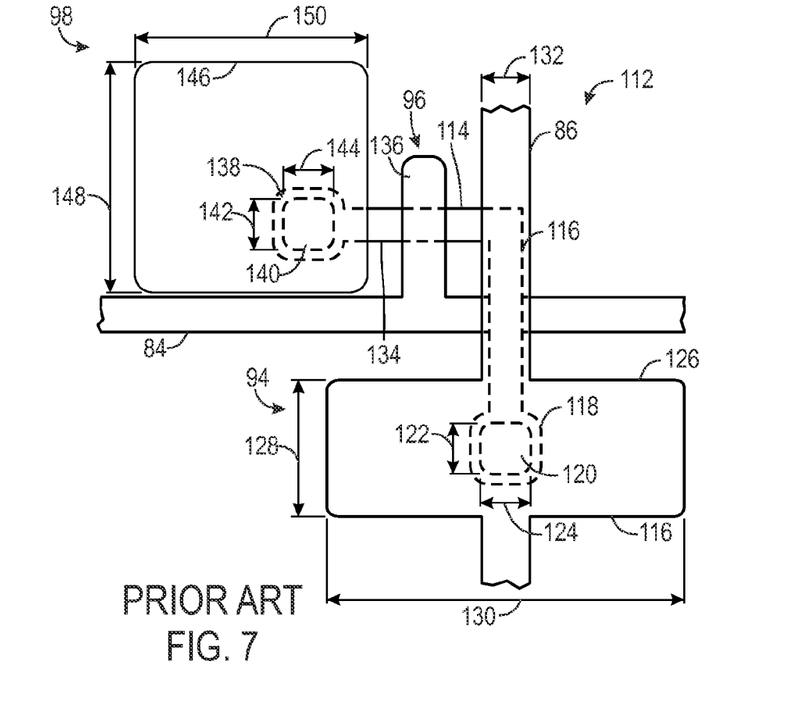
FIG. 7 shows a top view of a conventional TFT that may be used to implement a unit pixel for a conventional display.

Before continuing, it may be beneficial to describe some of the drawbacks faced by display devices with conventional displays. FIG. 7 illustrates a top view of a conventional TFT 112 used in a conventional display 12. As shown, the TFT 112 includes an active layer 114. By way of example, the active layer 114 may be formed from a silicon-based material, such as a-Si, poly-Si, and so forth. As illustrated, the active layer 114 is formed in an L-shaped configuration. A first portion 116 of the L-shaped active layer 114 extends parallel to the source line 86 which is formed over the first portion 116. Furthermore, the first portion 116 of the L-shaped active layer 114 extends perpendicular to the gate line 84 which is also formed over the first portion 116. The source 94 is formed at an end 118 of the first portion 116 of the L-shaped active layer 114. The end 118 may include a contact terminal 120 formed via a metallic layer deposited on, or in, the active layer 114.

The contact terminal 120 has a length 122 and a width 124. In certain embodiments, the length 122 and the width 124 may each be approximately 3 to 10 um. The source line 86 includes a routing portion 126 that electrically couples the source line 86 to the contact terminal 120. In certain embodiments, the routing portion 126 may have a length 128, width 130, and/or area (i.e., length 128 times width 130) larger than the contact terminal 120 to decrease the resistance of the routing portion 126. For example, the length 128 of the routing portion 126 may be approximately 8 to 30 um and the width 130 of the routing portion 126 may be approximately 30 to 50 um. Specifically, in the present embodiment, the length 128 of the routing portion 126 may be approximately 20 um and the width 130 of the routing portion 126 may be approximately 50 um. In certain embodiments, the source line 86 may have a width 132 of approximately 3 to 6 um.

A second portion 134 of the L-shaped active layer 114 extends parallel to the gate line 84 which is formed over the second portion 134. Furthermore, the second portion 134 of the L-shaped active layer 114 extends perpendicular to the source line 86 which is also formed over the second portion 134. A protrusion of the gate line 84 is formed directly over the second portion 134 of the L-shaped active layer 114 where the gate 96 is formed, as illustrated. The drain 98 is formed at an end 138 of the second portion 134 of the L-shaped active layer 114. The end 138 may include a contact terminal 140 formed via a metallic layer deposited on, or in, the active layer 114. The contact terminal 140 has a length 142 and a width 144. In certain embodiments, the length 142 and the width 144 may each be approximately 3 to 10 um.

A routing portion 146 electrically couples the pixel electrode 92 to the contact terminal 140. In certain embodiments, the routing portion 146 may have a length 148, width 150, and/or area (i.e., length 148 times width 150) larger than the contact terminal 140 to decrease the resistance of the routing portion 146. For example, the length 148 of the routing portion 146 may be approximately 20 to 40 um and the width 150 of the routing portion 146 may be approximately 15 to 45 um. Specifically, in the present embodiment, the length 148 of the routing portion 146 may be approximately 40 um and the width 150 of the routing portion 146 may be approximately 40 um. As will be appreciated, it may be desirable to decrease the area (e.g., length and/or width) of the routing portions 126 and 146; however, decreasing the area of the routing portions 126 and 146 may increase their resistance.

Figure 8:
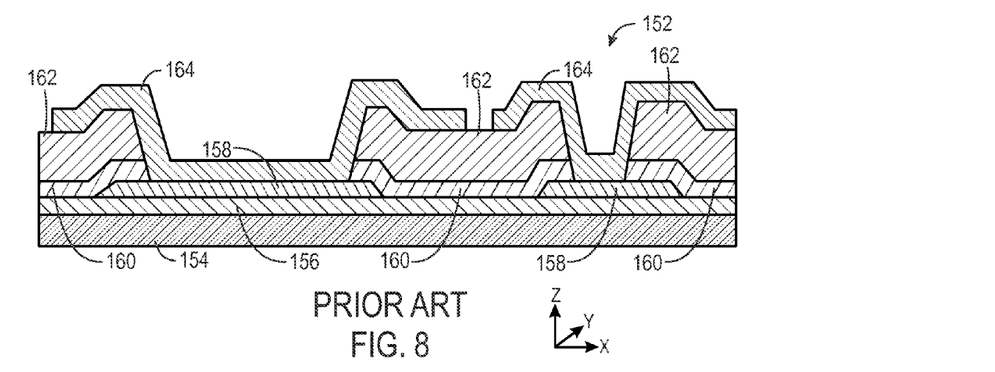
FIG. 8 shows a cross sectional view of layers that may be used to form a portion of a conventional display including the conventional TFT of FIG. 7.

A conventional display 12 including the TFT 112 of FIG. 7 may be manufactured by forming layers over a substrate. For example, FIG. 8 shows a cross sectional view of layers that may be used to form a portion 152 of a conventional display 12 including the conventional TFT 112 of FIG. 7. As shown, the portion 152 includes a glass substrate 154 on which a buffer layer 156 is formed. Contact terminals 158 (e.g., for the source 94, drain 98, or any other contact terminal) are formed over the buffer layer 156. By way of example, a metallic layer may be formed on the buffer layer 156. Furthermore, the metallic layer may be etched to form the contact terminals 158. A first inter-layer dielectric (ILD) 160 may be formed over (e.g., above in the z-direction) the buffer layer 156 between the contact terminals 158. Next a second ILD 162 may be formed over the first ILD 160. A metallic layer 164 may then be formed over the contact terminals 158 and the second ILD 162, as shown. Next, the metallic layer 164 may be etched, such as via patterning and etching. As will be appreciated, although they are not illustrated in the present embodiment, a pixel electrode 92 and/or a source line 86 may be coupled to the metallic layer 164. The metallic layer 164 may form routings of the display 12, such as routings between contact terminals 158, or any suitable routing (e.g., peripheral routing at a border of the display 12).

Figure 9:
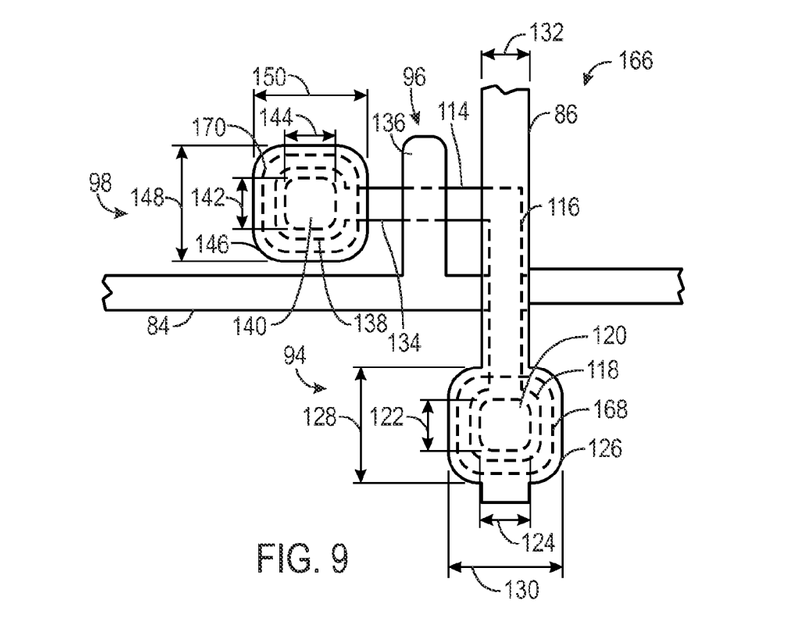
FIG. 9 shows a top view of a TFT with a reduced routing area over a source and a drain of the TFT, in accordance with aspects of the present disclosure.

As previously discussed, it may be desirable to decrease the area (e.g., length and/or width) of the routing portions 126 and 146 to produce smaller pixels 82. FIG. 9 illustrates a top view of a TFT 166 having routing portions 126 and 146 with a reduced area. For example, in the present embodiment, the width 130 of the routing portion 126 may be reduced from approximately 50 um as illustrated in FIG. 7 to approximately 20 um. To decrease the width 130 of the routing portion 126 and maintain or decrease the resistance coupled to the contact terminal 120 (without increasing a depth of the routing portion 126), a metallic layer 168 is disposed directly on the contact terminal 120 and the routing portion 126 is disposed directly on the metallic layer 168. Accordingly, a conductive portion having three metallic layers is formed. In certain embodiments, the metallic layer 168 and the routing portion 126 may be formed from the same metallic material.

As another example, in the present embodiment, the length 148 of the routing portion 146 may be reduced from approximately 40 um to approximately 20 um and the width 150 of the routing portion 146 may be reduced from approximately 40 um to approximately 20 um. To decrease the length 148 and/or width 150 of the routing portion 146 and maintain or decrease the resistance coupled to the contact terminal 140 (without increasing a depth of the routing portion 146), a metallic layer 170 is disposed directly on the contact terminal 140 and the routing portion 146 is disposed directly on the metallic layer 170. Accordingly, a conductive portion having three metallic layers is formed. In certain embodiments, the metallic layer 170 and the routing portion 146 may be formed from the same metallic material. Using such a technique, the area of the routing portions 126 and/or 146 may be reduced while maintaining or decreasing the resistance between the contact terminals 120 and 140 and the devices electrically coupled to the contact terminals 120 and 140.

Figure 10A:
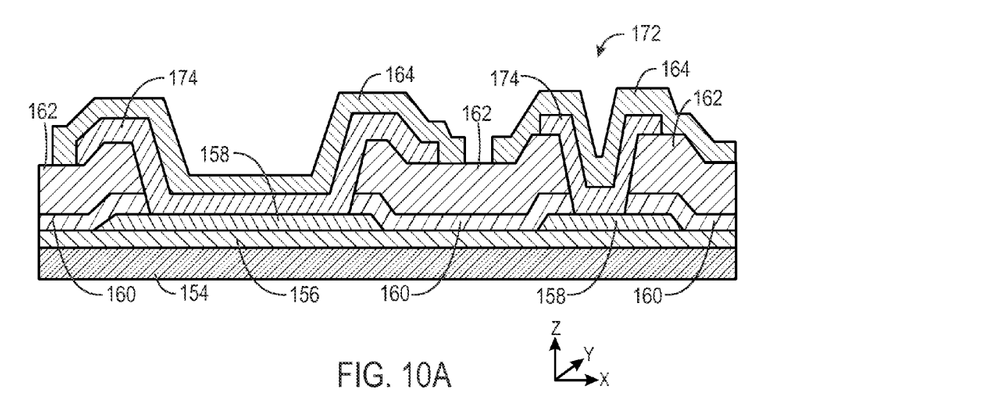
FIGS. 10A and 10B show cross sectional views of layers that may be used to form a portion of a display including the TFT of FIG. 9, in accordance with aspects of the present disclosure.
Figure 10B:
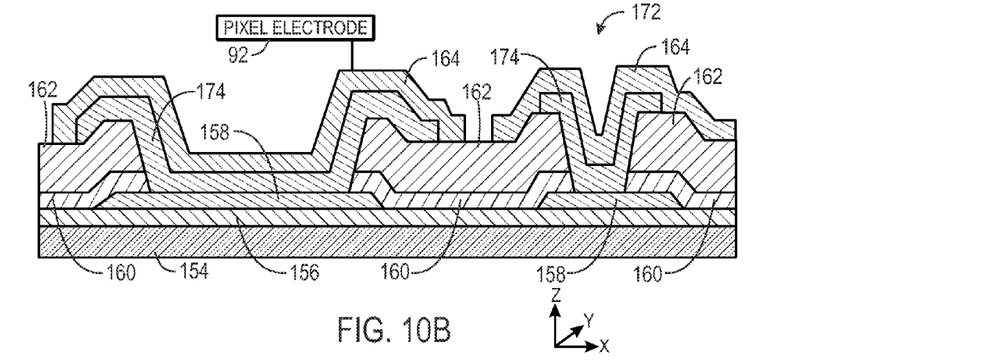

A display 12 including the TFT 166 of FIG. 9 may be manufactured by forming layers over a substrate. For example, FIGS. 10A and 10B show cross sectional views of layers that may be used to form a portion 172 of a display 12 including the TFT 166 of FIG. 9 (e.g., layers that may be used to form any contact areas and/or routings). As shown, the portion 172 includes an intermediate metallic layer 174 formed between the contact terminals 158 and the metallic layer 164. The intermediate metallic layer 174 is formed directly on the contact terminals 158.

Furthermore, the metallic layer 164 is formed directly on the intermediate metallic layer 174. As previously discussed, the resistance of the metallic layer 164 is increased when the length and/or width of the metallic layer 164 is reduced. One way to decrease the resistance is to increase the depth (e.g., in the z direction) of the metallic layer 164. However, increasing the depth of the metallic layer 164 decreases the accuracy of etching performed on the metallic layer 164. Accordingly, the depth of the metallic layer 164 remains the same and the intermediate metallic layer 174 is disposed between the contact terminals 158 and the metallic layer 164 to decrease the resistance of the metallic layer 164 (e.g., due to the combination of the metallic layer 164 and the intermediate metallic layer 174) and to enable etching with greater accuracy. The combination of the intermediate metallic layer 174 and the metallic layer 164 may form routings of the display 12, such as routings between contact terminals 158, or any suitable routing (e.g., peripheral routing at a border of the display 12). For example, the intermediate metallic layer 174 may be used in conjunction with the metallic layer 164 to reduce routing widths where the metallic layer 164 has a width greater than 6 um.

Figure 11:
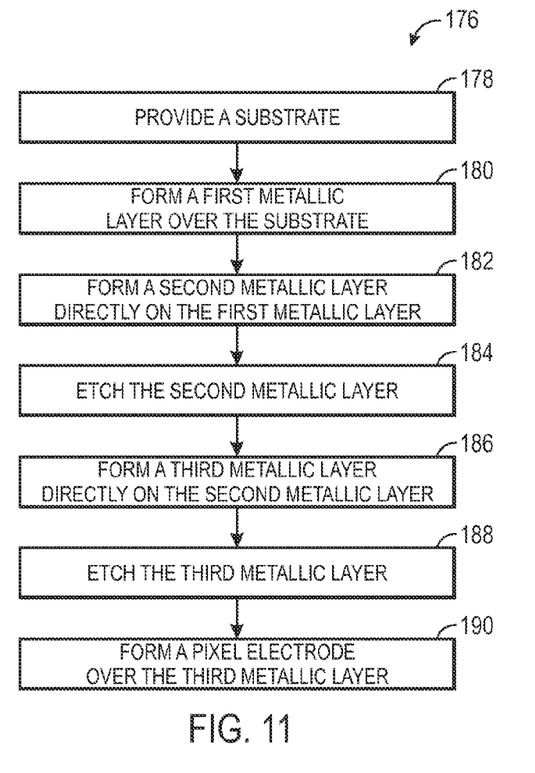
FIG. 11 depicts steps for fabricating the display of FIGS. 10A and 10B.

As previously discussed, the TFT 166 or other routings of a display 12 may be manufactured by forming layers over a substrate. One example of a method 176 for manufacturing a display 12 is illustrated in FIG. 11. The method 176 may include: providing a substrate (block 178), forming a first metallic layer over the substrate (block 180), forming a second metallic layer directly on the first metallic layer (block 182), etching the second metallic layer (block 184), forming a third metallic layer directly on the second metallic layer (block 186), and etching the third metallic layer (block 188). In certain embodiments, the method 176 may include forming a pixel electrode over the third metallic layer (block 190).

As discussed above, at block 178, the substrate is provided. For example, the substrate may include the glass layer 154 and the buffer layer 156 as illustrated in FIG. 10. The first metallic layer is formed over the substrate (block 180). The first metallic layer may include the contact terminals 158. The second metallic layer (e.g., intermediate metallic layer 174) is formed directly on the first metallic layer (block 182). As will be appreciated, the second metallic layer may be formed from any suitable material. In certain embodiments, the first metallic layer may be etched before the second metallic layer is formed directly on the first metallic layer. At block 184, the second metallic layer may be etched.

The third metallic layer (e.g., metallic layer 164) is formed directly on the second metallic layer (block 186). The third metallic layer may be formed from any suitable material. In certain embodiments (e.g., the embodiment shown in FIG. 10B), the second metallic layer and the third metallic layer may be formed from the same material. At block 188, the third metallic layer may be etched. It should be noted that forming the second metallic layer between the first metallic layer and the third metallic layer enables the third metallic layer to cover a reduced area, yet have a resistance equal to or lower than a third metallic layer without a reduced area and without the second metallic layer. In some embodiments, the pixel electrode 92 may be formed over the third metallic layer (block 190). In certain embodiments, the third metallic layer may be part of the source line 86. As will be appreciated, the disclosed embodiments provide examples of reducing the area of routings as they relate to a source and drain, however, the disclosed methods and devices may be used to reduce the area of routings, contacts, or other structures in the display 12. For example, the area (e.g., length and/or width) of ground planes, contacts (e.g., source, drain, gate), any signal routings or traces, and so forth may be reduced using the ideas disclosed herein.

Figure 12:
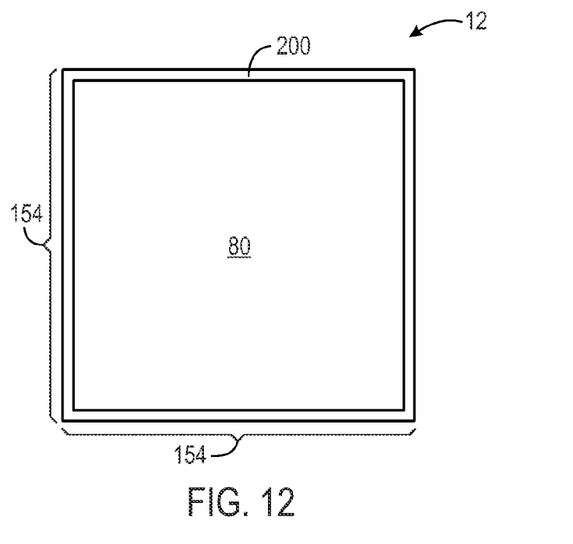
FIG. 12 shows a schematic view of peripheral routings at a border of a display, in accordance with an embodiment.

FIG. 12 depicts peripheral routings 200 of the display 12. The peripheral routings may be disposed over the substrate 154 at a border of the display 12 surrounding the display panel 80.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display device comprising:
a liquid crystal display (LCD) panel comprising a conductive signal routing portion having a first metallic layer, a second metallic layer formed directly on the first metallic layer, and a third metallic layer formed directly on the second metallic layer, wherein the first metallic layer comprises a contact terminal and wherein the second metallic layer and the third metallic layer are formed from the same material.

2. The display device of claim 1, wherein the second metallic layer is formed to reduce the resistance of the conductive signal routing portion.

3. The display device of claim 1, wherein the second metallic layer is formed to enable a reduced width of the third metallic layer.

4. The display device of claim 1, wherein the LCD panel comprises a plurality of display pixels arranged in rows and columns, wherein each of the display pixels comprises:
a pixel electrode; and
a thin-film transistor (TFT) coupled to a data line and a gate line, wherein the TFT comprises a source coupled to the data line, a drain coupled to the pixel electrode, and a channel extending between the source and the drain, and wherein the contact terminal comprises a source contact terminal, the third metallic layer comprises the data line, and the second metallic layer electrically couples the source contact terminal to the data line.

5. The display device of claim 1, wherein the third metallic layer is coupled to a pixel electrode.

6. The display device of claim 1, wherein the LCD panel comprises peripheral routings at a border of the LCD panel, the peripheral routings comprising the conductive signal routing portion.

7. A method for manufacturing a liquid crystal display (LCD) panel for a display device, comprising:
providing a substrate;
forming a first metallic layer over the substrate;
forming a second metallic layer directly on the first metallic layer;
etching the second metallic layer;
forming a third metallic layer directly on the second metallic layer; and
etching the third metallic layer, wherein forming the second metallic layer between the first metallic layer and the third metallic layer enables the third metallic layer to cover a reduced area while maintaining a resistance that would occur if the second metallic layer were not formed and the third metallic layer were not enabled to cover the reduced area
wherein the second metallic layer and the third metallic layer are formed from the same material.

8. The method of claim 7, comprising forming a pixel electrode over the third metallic layer.

9. The method of claim 7, comprising etching the first metal layer before the second metallic layer is formed on the first metallic layer.

10. The method of claim 7, wherein forming the third metallic layer comprises forming a data line over the second metallic layer.

11. The method of claim 7, wherein a combined resistance of the second metallic layer and the third metallic layer is smaller than a resistance of the third metallic layer.

12. The method of claim 7, wherein the reduced area of the third metallic layer is smaller than in an LCD panel formed without the second metallic layer.

13. A display device comprising:
a liquid crystal display (LCD) panel comprising a plurality of display pixels arranged in rows and columns, wherein each of the display pixels comprises:
a pixel electrode; and
a thin-film transistor (TFT) coupled to a data line and a gate line, wherein the gate line comprises a protrusion extending outwardly in a perpendicular direction, and wherein the TFT comprises:
an L-shaped active layer comprising a first portion that is parallel to the gate line and a second portion that is perpendicular to the gate line but parallel to the protrusion;
a drain terminal formed at an end of the first portion of the L-shaped active layer, wherein the drain terminal comprises a first portion of a first metallic layer,
wherein a second metallic layer is disposed directly on the first metallic layer, and wherein a third metallic layer is disposed directly on the second metallic layer; and
a source terminal formed at the end of the second portion of the L-shaped active layer, wherein the source terminal comprises a second portion of the first metallic layer non-contiguous of the first portion of the first metallic layer,
wherein the second metallic layer is disposed directly on the first metallic layer, and the third metallic layer is disposed directly on the second metallic layer, and wherein the data line forms the third metallic layer of the source terminal;
wherein the second metallic layer and the third metallic layer are formed from the same material.

14. The display device of claim 13, comprising a pixel electrode disposed on the third metallic layer of the drain.

15. The display device of claim 13, wherein the second metallic layer is disposed between the first metallic layer and the third metallic layer to reduced the resistance of the third metallic layer.

16. The display device of claim 13, wherein the second metallic layer is disposed between the first metallic layer and the third metallic layer to enable the area of the third metallic layer to be reduced.

17. The display device of claim 13, wherein the protrusion of the gate line extends over the L-shaped active layer.

18. An electronic device comprising:
a liquid crystal display (LCD) panel comprising a plurality of display pixels arranged in rows and columns, wherein each of the display pixels comprises:
a pixel electrode; and
a thin-film transistor (TFT) coupled to a data line and a gate line, wherein the TFT comprises a source coupled to the data line, a drain coupled to the pixel electrode, and a channel extending between the source and the drain;
wherein the data line comprises a reduced surface area formed by disposing a second metallic layer over a first metallic layer of the source and disposing a third metallic layer over the second metallic layer, and wherein the first metallic layer of the source forms a contact terminal of the source and wherein the second metallic layer and the third metallic layer are formed from the same material.

19. The electronic device of claim 18, wherein the second metallic layer is disposed between the first metallic layer and the third metallic layer to reduce the resistance of a conductive portion comprising the first, second, and third metallic layers.

* * * * *